June 15, 1926.

V. HEJMA 1,589,289

DIGGING MACHINE

Filed May 22, 1925

Inventor

V. Hejma

By Marks Clerk

Attorneys

Patented June 15, 1926.

1,589,289

UNITED STATES PATENT OFFICE.

VÁCLAV HEJMA, OF BRNO, CZECHOSLOVAKIA.

DIGGING MACHINE.

Application filed May 22, 1925, Serial No. 32,210, and in Czechoslovakia May 24, 1924.

This invention relates to a motor driven agricultural implement comprising spades and which not only ensures the accurate and reliable digging over of the soil, but also at the same time the loosening thereof, and which is useful in a variety of ways in agriculture.

The invention is illustrated in the accompanying drawings, wherein.

Figure 3:
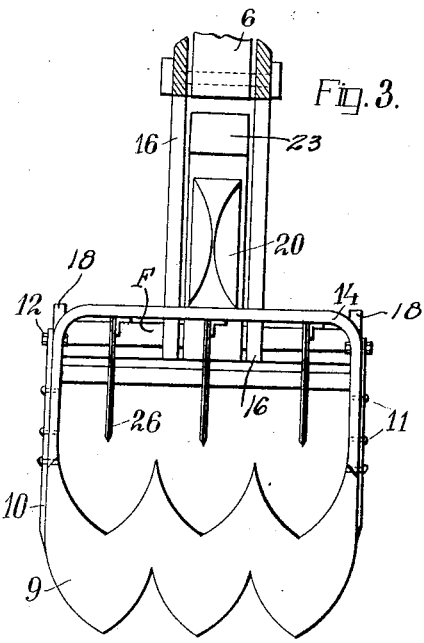

Figure 3 the same in front elevation.

Figure 1:
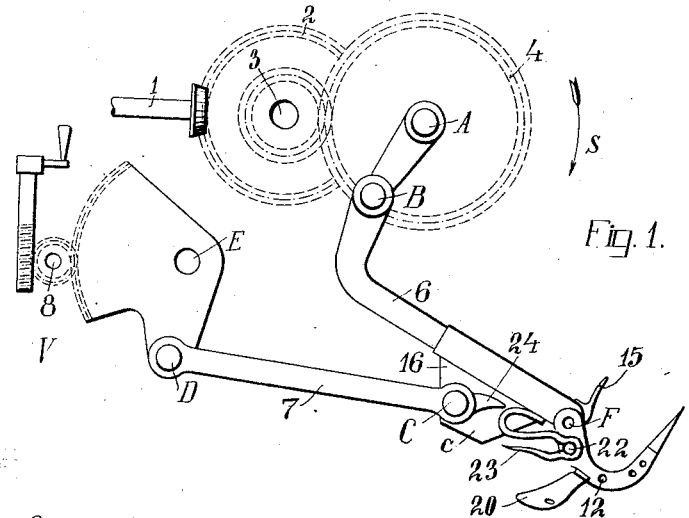
Figure 1 is a general view of the invention in side elevation.

The driving is effected by means of a motor of any desired construction and the power is transmitted by means of a shaft 1, a bevel wheel, and spur gears 2, 3 and 4, to a crank shaft A having a number of cranks corresponding to the number of spades. Adjacent cranks are separated from one another by an angle of 180°, and the crank shaft rotates during the digging in a clockwise direction as viewed in Fig. 1.

In the same direction move the upper ends of bent spade shanks 6, which are connected at B to the cranks, their lower ends being connected at D by means of link rods 7 with a sector which is rotatable about a horizontal pivot E by means of a worm gear 8.

When the cranks are rotating in the direction of the arrows s the lower ends of the spade shanks 6 move through a flat and substantially elliptical curve having its longitudinal axis perpendicular or approximately perpendicular to the ground.

This movement allows of an advantageous engagement of the spades, a uniform digging action and the turning over of the surface soil through the aperture in the spade in a forward direction. The spade shanks 6 are preferably bent at about a right angle in order that the turning over of the surface of the soil may begin and end before the spades come out of the ground, even when spades are employed which are rigidly attached to their shanks, such spades being preferably, in the case of deep soil, free from stones, on account of their simplicity.

Figure 2:
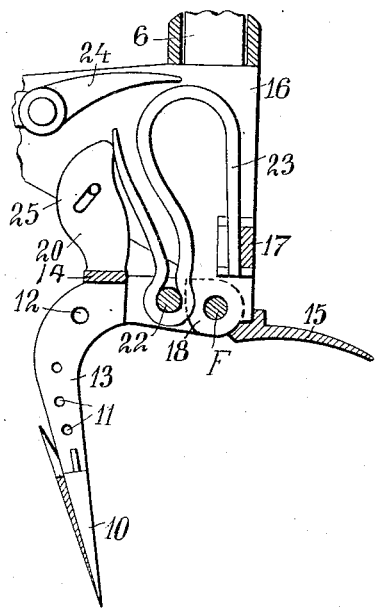
Figure 2 is the agricultural implement (a spade) in side elevation.

The spade 9 fitted to the shank 6, (Figures 2 and 3) consists of a notched blade 9 which is exchangeably secured by means of side strips 10 to a frame consisting of a broad, horizontal, transverse plate 14 and curved side plates 13.

In the upper part of the frame 14 are mounted knives 26 projecting into the aperture in the spade, these knives serving for the disintegration of the clods of earth that fall through.

The transverse plate 14 which widens out into a baffle plate 15 prevents the surface soil from being thrown over the edge of the transverse plate and regulates the turning of the soil.

With a rigid arrangement of the spade the latter is secured by means of the frame directly to the spade shank 6.

When working in stony ground the spade is, according to the invention, pivotally supported at the end of the shank 6 upon a pivot F and is held in its normal position by an S-shaped spring 23 pressing against a bridge piece 17. This spring 23 with its front loop passes round a pin 22 secured to the arms 18 and thus holds the spade in a position which is determined by a counterweight 20 secured to the frame 14 and the arms 18 and bearing at its upper end against the front end of the spring 23.

The counter-weight 20 and the pressure of the spring 23 bring about the correct engagement of the spade in the ground, and the spade can yield resiliently upon meeting with great resistance. As soon as the point of the spade has broken through the hard surface of the soil and has penetrated into softer earth the greater part of the energy of the spring, which has been compressed by the weight 20 and by a tappet 24, and also the greater part of the energy of the weight 20 itself, are liberated. This liberated energy causes a powerful rotary movement of the spade in an upward direction about the pivot F, which results in a complete turning over of the soil and a complete disintegration of the clods.

The spring 23 further ensures smooth working without vibration and noise.

The movable spade described may also be constructed in a partially rigid manner by providing a slot 25 in the balance weight 20. A pin secured to the plates 16 and engaging in this slot then prevents the counterweight 20, and therefore the spade, from swinging out completely.

What I claim is:—

1. A motor driven agricultural implement comprising a plurality of gapped spades, a shank attached to each spade, a power actuated crank shaft, each of the spade shanks being connected at a point remote from the spade with a crank of said crank shaft, a plurality of link rods each pivoted at one end to one of the spade shanks near the spade, a rotatable sector, said link rods each being pivoted at its other end to said sector, and means for rotating said sector by hand.

2. A motor driven agricultural implement comprising a power actuated shaft having a plurality of cranks, a plurality of spade shanks each pivotally mounted on one of said cranks, a spade pivoted to each of said spade shanks at the end remote from the crank shaft, a spring engaged between each spade and its shank in such a manner as to become stressed when the spade is being forced to the hard surface of the ground, a plurality of link rods each pivoted at one end to one of the spade shanks near the spade, an adjustable plate, each of the link rods being pivotally connected by the end remote from the spade to said adjustable plate, and a tappet on each of the link rods, said spring being so placed between said tappet and said spade that said tappet presses against it in a way tending to force the spade back to normal position on a down stroke of said crank, the arrangement being such that the potential strain energy stored in the spring assists in the turning over of the mold.

In testimony whereof I have signed my name to this specification.

Dr. VÁCLAV HEJMA.